United States Patent
Melody et al.

(10) Patent No.: US 6,261,434 B1
(45) Date of Patent: Jul. 17, 2001

(54) DIFFERENTIAL ANODIZATION PROCESS FOR ELECTROLYTIC CAPACITOR ANODE BODIES

(75) Inventors: Brian John Melody, Greer; John Tony Kinard; Philip Michael Lessner, both of Simpsonville, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/420,489

(22) Filed: Oct. 19, 1999

(51) Int. Cl.[7] .................................................... C25D 11/26
(52) U.S. Cl. ......................... 205/171; 205/175; 205/322; 205/332
(58) Field of Search ................................... 205/171, 174, 205/175, 322, 332

(56) References Cited

U.S. PATENT DOCUMENTS

| | | | |
|---|---|---|---|
| 3,415,722 | * 12/1968 | Scheller et al. ...................... 205/122 |
| 3,943,041 | 3/1976 | Jackson ................................ 205/152 |
| 4,052,273 | 10/1977 | Aronson et al. ..................... 205/171 |
| 4,131,520 | * 12/1978 | Bernard et al. ...................... 205/171 |
| 4,196,060 | 4/1980 | Patrie et al. . |
| 4,278,513 | 7/1981 | Millard et al. . |
| 4,334,102 | * 6/1982 | Decker et al. ........................ 568/621 |
| 4,781,802 | * 11/1988 | Fresic .................................. 205/171 |
| 5,612,082 | 3/1997 | Azuma et al. ......................... 427/96 |
| 5,643,432 | * 7/1997 | Qiu ....................................... 205/50 |
| 5,716,511 | 2/1998 | Melody et al. ....................... 205/324 |
| 5,837,117 | 11/1998 | Allegret ................................ 205/50 |
| 5,837,121 | 11/1998 | Kinard et al. ........................ 205/322 |
| 5,916,590 | * 6/1999 | Cody et al. ........................... 424/452 |

FOREIGN PATENT DOCUMENTS

| | | |
|---|---|---|
| 63-146425 | 6/1988 | (JP) . |
| WO0012783 | 3/2000 | (WO) . |

OTHER PUBLICATIONS

Satabase WPI, Section CH, Week 188830, Derwent Publications Ltd., XP002158206.
PCT/US00/26296 International Search Report, dated Feb. 6, 2001.

* cited by examiner

*Primary Examiner*—Bruce F. Bell
*Assistant Examiner*—William T. Leader
(74) *Attorney, Agent, or Firm*—Banner & Witcoff, Ltd.

(57) ABSTRACT

An electrolyte comprising water, an organic solvent selected from the group consisting of a polyethylene glycol, a polyethylene glycol monomethyl ether and mixtures thereof, and a sufficient amount of alkali metal salt of a weak organic acid, so that the electrolyte has a resistivity below about 250 ohm-cm/80° C. A method for differential anodizing porous valve metal body comprising the steps of: anodizing the bodies in a first electrolyte where the cathode surface is placed within an inch of but not in contact with the anode bodies, rinsing the bodies in deionized water, and re-anodizing the bodies in a second electrolyte, where the first electrolyte comprises water, an organic solvent selected from the group consisting of a polyethylene glycol, a polyethylene glycol monomethyl ether and mixtures thereof, and a sufficient amount of alkali metal salt of a weak organic acid so that the first electrolyte has a resistivity below about 250 ohm-cm/80° C.

10 Claims, No Drawings

DIFFERENTIAL ANODIZATION PROCESS FOR ELECTROLYTIC CAPACITOR ANODE BODIES

FIELD OF THE INVENTION

The invention is directed to the anodization of porous valve-metal anode bodies used for the fabrication of electrolytic capacitors and, in particular, to a differential anodization of porous capacitor anode bodies which produces an anodic oxide film which is thicker on the outer surfaces and thinner within the bulk of the anode bodies.

BACKGROUND OF THE INVENTION

It has been known for many years that porous valve-metal capacitors employing the valve metal as one capacitor plate, the anodic oxide as the dielectric, and a solid-state electrolyte, such as manganese dioxide, as the second capacitor plate (typified by so-called "solid" tantalum capacitors) give more reliable service with respect to device short-circuit prevention when the field through the anodic oxide is relatively low, i.e. when the voltage applied to the device in service is significantly lower than that used to produce the anodic oxide dielectric film. As a consequence of this fact, manufacturers employ anodizing voltages that are 2 to 5 (or more) times as high as the service-rated voltage of the devices.

It has also been known for many years that the presence of a thicker anodic oxide film on the external surfaces of valve-metal anode bodies offers a good deal of protection from short-circuiting of the devices when the anodic oxide film thickness on the internal surfaces of the anode bodies is minimized for the purposes of minimizing the use of expensive anode materials, such as tantalum, or for maximizing the device capacitance for a given anode size. There are at least 3 contributing factors which combine to make thickness of the external oxide of greater importance with respect to device reliability than the interior oxide thickness:

1) The radius of curvature of the corners and edges of the anodes raises the electric field in these areas, making them more prone to short-circuit failure.

2) The voltage drop across the "solid" electrolyte (e.g. manganese oxide) is lowest on the outer surface of the anodes, making somewhat higher currents available to oxide flaws on the external anode surfaces.

3) The external anode surfaces, particularly corners and edges, of powder-metallurgy porous valve-metal anode bodies become damaged during bulk handling in the manufacturing process. Anodes abrade against each other, as well as against feeder bowl and vibratory track surfaces, etc. The abrasion encountered during bulk handling has been demonstrated to cause the passive oxide film (formed upon contact with the atmosphere after the sintering operation) to become imbedded in the external anode surfaces. This abrasively-imbedded passive film gives rise to flaws in the anodic dielectric film on abraded areas of the anode (described in U.S. Pat. No. 5,716,511). Although oxide "blisters" become readily apparent at anodizing voltages above about 100 volts, the incipient flaws are present at all film thicknesses and give rise to disproportionately high leakage currents with increasing field.

Several techniques for producing a thicker anodic oxide film on the external surfaces of anodized porous anode bodies are described in the patent literature.

U.S. Pat. No. 3,415,722 (Scheller, et al.) describes the method of anodizing porous capacitor bodies to form a uniform dielectric film throughout said anode bodies, impregnating the anode bodies with a solid, non-conducting material (wax, stearin, anthracene, etc.) removing the insulating solid from the external anode surfaces and anodizing at a voltage higher than the initial voltage of the external surfaces to form an oxide film on the external surfaces which is thicker than the internal anodic oxide. The insulating solid is then removed from the bodies of the anodes prior to processing into finished capacitors.

A somewhat similar process is described in U.S. Pat. No. 5,643,432 (Qiu). This patent describes the production of a thicker external oxide via the impregnation of an anodized porous body electrode with an electrolyte-insoluble, insulating liquid (benzene, xylene, etc.), evaporation of the insulating liquid from the external surfaces of the anode body, and formation of a relatively thick anodic oxide layer on the external surfaces of the anode bodies at a voltage higher than the initial anodizing voltage. The remainder of the solvent is evaporated prior to processing the anodes into finished capacitors.

A differential anodizing process (i.e., an anodizing process for porous valve-metal capacitor bodies producing a uniform internal anodic oxide thickness with a significantly thicker oxide on the external anode surface) is described in U.S. Pat. No. 4,131,520 (Bernard, et al.). This patent describes the production of a thicker external anodic oxide film on anodized porous anode bodies via the use of electrolytes consisting of aqueous solutions of the salts of weak acids (e.g. borax 0.01%–4.0% or ammonium pentaborate/boric acid). The flow of electric current gives rise to a partitioning of the electrolyte into an anion-rich portion inside the anodes and a cation-rich portion external to the anode bodies. The anion-rich electrolyte inside the anode bodies tends to undergo re-association to form the weak acid, giving a relatively high electrolyte resistivity inside the anodes and an associated much higher rate of anodic oxide formation on the external anode surfaces. Again, a higher anodizing voltage is used to produce the external anodic oxide film.

U.S. Pat. No. 4,131,520 also relates an additional method of achieving differential anodizing; the anodized porous valve metal anodes are dipped into a solvent which does not readily transport the anions of weak acid salts into the bodies of the porous anodes and the solvent-dipped anodes are then anodized at a voltage higher than the initial anodizing voltage to produce the thicker external anodic oxide.

More recently, another differential anodizing method is described in U.S. Pat. No. 5,837,121 (Kinard et at.), in which the non-thickness-limited anodizing capability of solutions of dibasic potassium phosphate in glycerine containing less than 0.1% water and operated above about 150° C. is employed to produce a relatively thick layer of anodic oxide on the external surfaces of anodes while producing relatively little oxide growth on the internal surfaces of the anode bodies (The non-thickness-limited anodizing process is also described in detail in the paper entitled: "The Non-Thickness-Limited Growth of Anodic Oxide Films on Valve Metals", by Brian Melody, Tony Kinard, and Philip Lessner, which was published in *Electrochemical and Solid State Letters*, Vol. 1, No. 3, pages 126–129 , 1998).

All of the above methods of differential anodizing (i.e., anodizing which produces a thicker anodic oxide film on the external surfaces than on the internal surfaces of porous, value-metal anode bodies) have serious drawbacks in commercial capacitor production. The method described in U.S. Pat. No. 3,415,722 produces anodized anodes containing a waxy substance which is difficult to remove completely and which may interfere with the solid electrolyte impregnation process if incompletely removed.

The process described in U.S. Pat. No. 5,643,432 gives rise to the leaching of water insoluble liquid organic materials from the anodes during the second anodizing step. This gives rise to uncertain shielding of the internal portions of the anodes so-treated from the second anodization step electrolyte, resulting in unpredictable capacitance loss and electrolyte contamination.

The first process described in U.S. Pat. No. 4,131,520, that of employing an aqueous solution of the salt of a weak acid, is very sensitive to the presence of contamination; specifically, any phosphate, etc., remaining within the anode bodies from the initial anodizing step tends to defeat the differential nature of the anodizing process, resulting in the production of additional oxide film growth on the internal surfaces of the anode bodies with the loss of device capacitance. The second process described in U.S. Pat. No. 4,131,520, that of dipping the anodes in de-ionized water or ethylene glycol prior to the second anodization step, requires the additional liquid-dipping step and a short duration between the liquid dipping step and the second anodization step to prevent erratic results due to solvent evaporation. Also, when ethylene glycol or other organic material is used, the anodizing electrolyte becomes progressively contaminated with the organic solvent.

The method described in U.S. Pat. No. 5,837,121, which makes use of non-thickness-limited anodizing phenomena to achieve differential anodizing, requires the use of electrolyte at a temperature above about 150° C., which is difficult to maintain and manipulate in production equipment which is not specifically designed for this purpose (most anodizing tanks are designed for use below 100° C.).

All of the above methods of differentially anodizing anodes so as to produce a thicker external oxide, with the exception of the process described in U.S. Pat. No. 5,837,121, call for the anodes to first be anodized to form uniformly thick anodic oxide throughout the porous anode bodies prior to the anodization step used to produce the thicker external oxide. The electrolytes used to anodize porous anode bodies almost always contain the orthophosphate ion due to the enhanced thermal stability of anodic oxides formed in phosphate-containing electrolytes. Unfortunately, the same incorporated phosphate which enhances the thermal stability of the anodic oxide, also tends to reduce the wettability of the oxide by aqueous solutions, including the electrolytes used to produce the thicker external oxide film during the secondary anodization process. The reduced wettability of the anode surfaces covered with phosphate-doped anodic oxide results in the non-uniform production of the thicker external oxide due to the presence of air/gas bubbles present in contact with the external surface of the porous anode bodies and not displaced by the electrolyte used to produce the thicker external anodic oxide film This problem is addressed by the anodizing method given in U.S. Pat. No. 4,278,513, in which 0.01% to 1.0% of a non-ionic surfactant is added to the second-stage electrolyte in order to affect anode-wetting and to displace any air/gas bubbles in contact with the anodes.

Additionally, there is evidence that the anodic oxide stoichiometry which is largely established during the constant voltage portion of the first-stage anodizing step (which produces the oxide of uniform thickness throughout the anode bodies) is upset by the rapid growth kinetics in the second-stage anodizing step which produces the thicker oxide on the external anode surfaces.

SUMMARY OF THE INVENTION

The invention is directed to the anodization of porous valve-metal anode bodies and, in particular, to the differential anodization of porous capacitor anode bodies so as to produce an anodic oxide film which is thicker on the outer surfaces and thinner within the bulk of the anode bodies. This differential anodizing process allows reduction of the field applied across the anodic oxide on the outer surface of the anode bodies during use (i.e., to reduce the voltage per unit thickness across the oxide on the external anode surfaces) while maintaining the capacitance as high as is reasonably possible throughout the bulk of the anode bodies.

The invention is further directed to an electrolyte suitable for use in differential anodizing of porous valve metal bodies, and in particular to an electrolyte with an electrical resistivity lower than that of the inside of the porous anode bodies. The electrolyte comprises at least one alkali metal salt of a weak acid, water, and an organic solvent selected from a polyethylene glycol, a polyethylene glycol monomethyl ether, or mixtures thereof. The alkali metal salt of a weak acid may be any suitable metal salt of a weak, liquid, organic acid, including but not limited to an alkali metal salt of acetic, propionic, butyric, and heptanoic acids or mixtures thereof.

The invention is further directed to anodizing the porous valve metal in an electrolyte comprising at least one polyethylene glycol, polyethylene glycol monomethyl ethers, or mixtures thereof, water, and an alkali metal salt of a weak, liquid, organic acid to form a relatively thick layer on the outer surfaces; rinsing the anodes in deionized water; and anodizing the anodes again using a standard electrolyte to form a relatively thin uniform layer within the anode bodies.

It is to be understood that both the foregoing general description and the following detailed description are exemplary and explanatory only and are not restrictive of the present invention as claimed.

DETAILED DESCRIPTION OF THE PREFERRED EMBODIMENTS

It was discovered that differential anodizing of porous, valve-metal capacitor bodies can be achieved in traditional anodizing equipment by spacing the cathode surface relatively close to the anode bodies, by employing relatively high anodizing currents, and by producing a relatively thick external oxide layer prior to anodizing the internal surfaces of the anode bodies with a suitable anodizing solution/electrolytes to form a uniform thin layer throughout the internal surfaces. The outer layer thickness is least 20%, typically 20% to 100%, thicker than the internal layer. The lower the device rated voltage, the greater percent difference between the internal and external layer thickness.

In the commercial production of solid capacitors, the anodes are generally welded to carrier bars, which, in turn, are supported by a carrier framework, known as a "process head" or "lid" of anodes. In a preferred method of the invention, the process heads of anodes are suspended with the anodes immersed in the anodizing electrolyte and an essentially flat cathode surface is supported under the anode bodies at a distance closer than about one inch, preferably closer than about 0.5 inch, inch where at no time in the production process does the cathode surface actually touch the anode bodies. The cathode surface may be any suitable conductive material and form, including but not limited to stainless steel sheet, perforated stainless steel sheet, stainless steel wire mesh, Alloy 20Cb3, platinum, gold, or combinations thereof.

During formation of the outer thicker layer, the electrolyte resistivity inside the porous anode bodies should be much higher than that of the bulk electrolyte surrounding the anodes to prevent an oxide film from forming on the internal surfaces of the anodes. The electrolyte should also be resistant to contamination by ionic substances to prevent the unintentional formation of anodic oxide on the interior surfaces of porous anode bodies. The electrolyte should also not be readily desiccated to form conductive solid deposits on the anode wires above the air/electrolyte interface such as are frequently observed with the borate-containing electrolytes described in U.S. Pat. No. 4,131,520. Borate deposits on the anode wire tend to lead to the production of conductive crystalline tantalum oxide or "gray out" on the wire surfaces, especially with higher anodizing voltages and currents.

It was discovered that the various desirable electrolyte properties, described above, may be obtained with an electrolyte containing one or more of the alkali metal salts of weak organic acids, water, and one or more organic solvents selected from polyethylene glycols, polyethylene glycol monomethyl ethers, and mixtures thereof. The electrolyte is used in the first anodizing step in a two-step or differential anodizing process and a standard electrolyte is used in the second step.

Thus, the invention is directed to anodizing a porous valve metal in an electrolyte comprising at least one polyethylene glycol, polyethylene glycol monomethyl ethers, or mixtures thereof, water, and an alkali metal salt of a weak, liquid, organic acid to form a relatively thick layer on the outer surfaces; rinsing the anodes in deionized water; and anodizing the anodes again using a standard electrolyte to form a relatively thin layer within the anode body.

Suitable polyethylene glycols include polyethylene glycol 300 and suitable polyethylene glycol monomethyl ethers include polyethylene glycol monomethyl ether 350 which are sold by the Union Carbide Corporation under the brand names of Carbowax PEG 300 and Carbowax MPEG 350, respectively. These solvents have high thermal and electrochemical degradation resistance, low cost, low toxicity, ready availability, and high water solubility, and provide low conductivity (high resistivity) in electrolytes at concentrations above about 80%.

The alkali metal salt of a weak organic acid is obtained from any suitable organic acid such as acetic, propionic, butyric, or heptanoic acids or mixtures thereof. The alkali metal salt of a weak organic acid facilitates the production of the relatively undissociated acid within the pores of the porous anode bodies during the high current density differential anodizing step. The organic acid minimizes deposition of solids within the anode bodies under the somewhat desiccating conditions which occur inside the porous anode bodies during differential anodizing.

The alkali metal ions form relatively soluble compounds with any impurities present within the pores of the porous valve metal anode bodies, including but not limited to phosphates, thus facilitating removal of these materials from the differentially anodized anode bodies during the post-anodizing rinse process used to remove the anodizing electrolyte. Potassium salts have been found to be particularly soluble and are the preferred salts for use in the electrolytes of the present invention. Particularly preferred is potassium acetate.

The electrolytes of the invention tend to become desiccated within the pores of the anode bodies during the differential anodizing process, resulting in an increase in electrolyte resistivity to relatively high values and, consequently, the production of a relatively small amount of anodic oxide on the internal surfaces of the anodes in these electrolytes, especially at higher current densities.

The electrolyte comprises an aqueous solution of from about 50 % to about 80%, preferably from about 55% to about 75%, by weight organic solvent and a sufficient quantity of potassium acetate (or other alkali metal salt of a weak, liquid organic acid) to produce an electrolyte resistivity below about 500 ohm-cm/80° C., preferably lower than about 300 ohm-cm/80° C., and more preferably between the range of about 200 to 250 ohm-cm/80° C., at a current density sufficient to produce the differential anodizing desired (generally, above about 25 milliamperes per anode body). Typically, the amount of the alkali metal salt of a weak, liquid organic acid is about 1% to about 10% of the total solution, preferably about 3% to about 7% of the total solution, more preferably about 5 wt % of the total solution.

In order for the process to yield a uniform external anodic oxide film thickness, the field surrounding each anode must be fairly uniform. Such uniformity is achieved with relatively low electrolyte resistivity.

The electrolyte temperature is known to those skilled and is typically from about 80° C. to about 90° C.

Any suitable means to apply the voltage/current to the anodes may be used in the method of the present invention such as a power supply capable of maintaining both constant current and constant voltage by applying a constant current (above about 25 milliamperes per anode body) until a preset voltage is reached and then holding the anode bodies at constant voltage for a Cpreset amount of time.

The differential anodizing voltage giving best results is found to vary somewhat with anode size and anode voltage rating, etc. But a generally useful formula which may be used to calculate the differential anodizing voltage is as follows: Differential Anodizing Voltage=(1.3) (Standard Anodizing Voltage)+35 Volts Such that anodes which are to be anodized to 40 volts would be subjected to the differential anodizing voltage of D.A.V. =(1.3) (40 volts) +35 volts =87 volts. With a hold time from about 0 to about 20 minutes, preferably from about 0 to about 10 minutes, more preferably from about 1 to about 5 minutes and most preferably about 5 minutes at voltage, the differential anodizing process of the present invention results in the growth of an external oxide layer around each anode body having a thickness equivalent to that obtained at approximately 55 to 65 volts via traditional anodizing or about 50% thicker than would be obtained at the 40 volt/80° C. to 90° C. standard anodizing voltage.

The porous anode bodies are anodized with the electrolyte of the invention, rinsed with water, and then anodized normally to produce the anodic oxide film throughout the pore structure of the porous anode bodies using a standard electrolyte well known to those skilled in the art. Such standard electrolytes include, but are not limited to the combination of aqueous ethylene glycol and phosphoric acid. The rinse step in de-ionized water removes the electrolyte used to produce the thicker external anodic film. Examples of suitable electrolytes include aqueous polyethylene glycol plus phosphoric, an aqueous polyethylene glycol monomethyl ether plus phosphoric acid, an aqueous polyethylene glycol dimethyl ether plus phosphoric acid, aqueous phosphoric acid, or aqueous glycerine plus phosphoric acid.

The following examples illustrate how the anodizing method and electrolyte of the present invention may be used to advantage in the production of "solid" electrolyte capacitors:

EXAMPLES

The invention will be further described by reference to the following examples. These examples should not be construed in any way as limiting the invention.

Example 1

In order to demonstrate the improved performance of capacitors using the method and electrolyte of the present invention, a batch of anodes, rated 330 microfarads/10 volts, was pressed and sintered from Show a tantalum powder no. S506. The anodes were split into 3 groups for anodizing:

Group 1)
Anodized traditionally in an aqueous electrolyte containing ethylene glycol and phosphoric acid Group 2)
Anodized in an electrolyte of the present invention (55% polyethylene glycol 300 and 1% potassium acetate) to produce a thicker external oxide film, then anodized in the same electrolyte used to anodize the anodes in Group 1

Group 3)
Anodized in the same electrolyte as the anodes in Group 1, then anodized in the same electrolyte of the present invention as the anodes in Group 2 in order to produce a thicker anodic oxide film on the external surfaces of the anodes.

The three groups were then processed together into carbon and silver painted-coated capacitors. Table 1 shows the average capacitance and leakage current for each of the three groups.

TABLE 1

|  | 1 kHz Capacitance | D.C. Leakage |
| --- | --- | --- |
| Group 1 | 357.6 microfarads | 7.404 nicroa,peres |
| Group 2 | 341.6 microfarads | 4.011 microamperes |
| Group 3 | 320.0 microfarads | 6.995 microamperes |

By performing the differential anodizing step prior to the standard anodizing step, in accordance with the present invention, the leakage current was reduced by about 46% while the capacitance was reduced by only about 4½%. In contrast, performing the differential anodizing step after the standard anodizing step only reduced the leakage current by about 5½% but reduced the capacitance by about 10½%. Thus, with the electrolytes of the present invention, the differential anodizing step (i.e., the anodizing step which produced the relatively thick external anodic oxide film) is best carried out prior to the standard anodizing step which produced the anodic oxide throughout the pores of the porous anode bodies.

Example 2

In order to demonstrate the utility of the differential anodizing method and electrolytes of the present invention, three groups of anodes were fabricated from 50,000 microfarad-volts/gram tantalum powder. All of these groups of anodes were rated 470 microfarads/10 volts. The size of the anodes for each group was designed so that the anodes of the first group had a nominal standard anodizing voltage of 35 volts, the second group had a nominal anodizing voltage of 30 volts, and the third group had a nominal anodizing voltage of 20 volts. Half of each group was differentially anodized at 30 milliamperes per anode, to a voltage of 80 volts (5 minutes hold time at voltage) in an electrolyte of the present invention consisting of 75% polyethylene glycol 300 and 4–5 wt % potassium acetate (1 kHz Resistivity=240 ohm-cm at 80° C.).

After the differential anodizing step and water washing of the anodes, all of the anodes of each group were then anodized in a standard production electrolyte to 35, 30, or 20 volts as indicated above. The anodes were then processed into carbon and silver paint-coated capacitors, ready for encapsulation. The capacitance and leakage current of each group was read at this point in processing. The average values are given in Table 2.

TABLE 2

| Standard Anodizing Voltage | Differential Anodization | Capacitance (1 kHz) | Capacitance Loss | D.C. Leakage 10 volts | D.C. Leakage Reduction |
| --- | --- | --- | --- | --- | --- |
| 35 volts | no | 484.9 MFD |  | 0.284 uA |  |
| 35 volts | yes | 449.8 MFD | 7.3% | 0.245 uA | 13.7% |
| 30 volts | no | 475.6 MFD |  | 0.625 uA |  |
| 30 volts | yes | 434.4 MFD | 8.7% | 0.368 uA | 41.2% |
| 20 volts | no | 478.1 MFD |  | 1.819 uA |  |
| 20 volts | yes | 394.3 MFD | 17.5% | 0.473 uA | 74.0% |

MFD = microfarads, uA = microamperes

Thus, by employing the differential anodizing methods and electrolytes of the present invention, the percentage reduction in capacitance is relatively small compared to the reduction in device leakage current. This is particularly true for anodizing voltages which are relatively low (e.g., 2 to 3 times the rated voltage of the capacitors). The differential anodizing method and electrolytes of the present invention may be employed to help reduce the leakage current of porous-body, valve metal "solid" capacitors under conditions of reduced anodizing voltage, such as would be encountered in capacitors designed to maximize capacitance per package size or to minimize use of expensive valve metal powders, such as tantalum powder.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method for differential anodizing porous valve metal body comprising the steps of:

a) anodizing said body in a first electrolyte
   b) rinsing said body in deionized water, and
   c) re-anodizing said body in a second electrolyte,
      wherein said first electrolyte comprises water, an organic solvent selected from the group consisting of a polyethylene glycol, a polyethylene glycol monomethyl ether and mixtures thereof, and a sufficient amount of alkali metal salt of a weak organic acid so that said first electrolyte has a resistivity below about 250 ohm-cm/ 80° C.

2. The method of claim 1 wherein said first electrolyte contains from about 50% to about 80% organic solvent, based on the total weight of the electrolyte.

3. The method of claim 2 wherein said first electrolyte contains from about 55% to about 75% organic solvent, based on the total weight of the electrolyte.

4. The method of claim 1 wherein said cathode surface is within one inch of contact with said anode bodies.

5. The method of claim 1 wherein said the organic solvent is polyethylene glycol 300.

6. The method of claim 1 wherein said the organic solvent is polyethylene glycol monomethyl ether 350.

7. The method of claim 1 wherein said weak organic acid is an acetic, propionic, butyric, or heptanoic acid or mixtures thereof.

8. The method of claim 1 wherein said alkali metal salt of a weak organic acid is potassium acetate.

9. The method of claim 1 wherein said valve metal is tantalum.

10. The method of claim 1 comprising about 1% to about 10% of said alkali metal salt of a weak organic acid.

* * * * *